(12) United States Patent
Steinmueller et al.

(10) Patent No.: US 6,628,008 B2
(45) Date of Patent: Sep. 30, 2003

(54) DEVICE WITH A TRANSPONDER, IN PARTICULAR AN ACTUATING ELEMENT FOR A MOTOR VEHICLE

(75) Inventors: Antje Steinmueller, Regensburg (DE); Peter Weigert, Laaber (DE)

(73) Assignee: Siemens Aktiengesellschaft, Munich (DE)

( * ) Notice: Subject to any disclaimer, the term of this patent is extended or adjusted under 35 U.S.C. 154(b) by 218 days.

(21) Appl. No.: 09/742,182

(22) Filed: Dec. 22, 2000

(65) Prior Publication Data

US 2001/0024158 A1 Sep. 27, 2001

(30) Foreign Application Priority Data

Dec. 22, 1999 (DE) ......................................... 199 62 219

(51) Int. Cl.$^7$ ............................................... B60R 25/00
(52) U.S. Cl. ..................... 307/10.3; 174/52.2
(58) Field of Search ............................. 307/10.1, 10.2, 307/10.3; 174/52.2

(56) References Cited

U.S. PATENT DOCUMENTS

| | | | | |
|---|---|---|---|---|
| 4,642,734 A | * | 2/1987 | Anderson | 361/820 |
| 5,632,168 A | * | 5/1997 | Yano | 70/278.3 |
| 5,974,844 A | * | 11/1999 | Harrelson et al. | 70/408 |
| 5,992,663 A | * | 11/1999 | Mitchell | 220/4.21 |
| 6,049,279 A | * | 4/2000 | Minarovic | 340/572.8 |
| 6,144,301 A | * | 11/2000 | Frieden | 340/572.8 |
| 6,452,497 B1 | * | 9/2002 | Finlayson | 340/572.8 |
| 2002/0128769 A1 | * | 9/2002 | Der Ghazarian et al. | 340/988 |

FOREIGN PATENT DOCUMENTS

| | | | | |
|---|---|---|---|---|
| EP | 0863489 | * | 9/1998 | ............ G07C/1/26 |
| GB | 2291106 | * | 1/1996 | ............ E05B/49/00 |
| JP | 10-061276 | * | 3/1998 | ............ E05B/49/00 |
| JP | 11-256895 | * | 9/1999 | ............ E05B/19/00 |
| JP | 2001-140513 | * | 5/2001 | ............ E05B/19/00 |
| WO | WO 97/16963 | * | 5/1997 | ............ H04B/1/59 |

* cited by examiner

Primary Examiner—Brian Sircus
Assistant Examiner—Roberto J. Rios

(57) ABSTRACT

A device for communicating a signal with respect to an authorization system for actuating a motor vehicle, and the device is relatively portable with respect to the motor vehicle. The device includes a first housing part, a cavity extending into the first housing part, a member substantially filling the cavity, a transponder being embedded in the member, and a second housing part connecting to the first housing part. The first housing part has an exterior surface and includes a first material. The cavity includes a first cavity portion and a second cavity portion. The first cavity portion extends into the first housing part from a first opening in the exterior surface, and the second cavity portion extends in the first housing part between a second opening in the exterior surface and the first cavity portion. The member includes a second material that is different from the first material, and the member has a portion at least partially visibly at the first opening. The transponder is embedded in the member such that at least one of removing the transponder and attempting to remove the transponder visibly damages at least one of the portion of the member, the first opening in the exterior surface, and the exterior surface. The second housing part connects to the first housing part after the member fills the cavity, and the second housing covers the second opening.

17 Claims, 3 Drawing Sheets

DEVICE WITH A TRANSPONDER, IN PARTICULAR AN ACTUATING ELEMENT FOR A MOTOR VEHICLE

CROSS REFERENCE TO RELATED APPLICATIONS

This application claims the benefit of priority based on German Application No. 199 62 219.1, filed Dec. 22, 1999, which is incorporated by reference herein in its entirety.

BACKGROUND OF THE INVENTION

The invention relates to a device with a transponder, in particular a portable device for actuating a motor vehicle.

In modern access control systems, it is believed that an authorization check frequently takes place. It is believed that data stored on a device that an authorized person has with him is compared to data stored in the system and access is only possible if the comparison is positive. In this process, it is believed that the stored data is usually stored in a transponder, i.e., a device having a transmitting/receiving component, by means of which the data can be sent/read. If a transponder such as this is removed from an electronic vehicle key, for example, or another data carrier that can is portable with respect to the vehicle, then it is believed that access to the vehicle is no longer protected. It is believed that transponders have been placed in cavities that are not accessible from outside of a device housing. When these housings are made up of several parts, it is believed that the housing can be disassembled and the transponder removed without this being visible from the outside of the device. Thus, it is believed that the authorized person thus does not know whether the component that he is carrying has been tampered with and whether an access control system can be penetrated by an unauthorized person.

It is believed that there is a need to provide a device that includes a remedy for at least the disadvantage described above.

SUMMARY OF THE INVENTION

The present invention provides a device for communicating a signal with respect to a system, and the device is relatively portable with respect to the system. The device comprises a housing having a cavity adjacent an exterior surface; and a transponder located in the cavity such that movement of the transponder in the cavity damages the exterior surface.

The present invention also provides a device for communicating a signal with respect to an authorization system for actuating a motor vehicle, and the device is relatively portable with respect to the motor vehicle. The device comprises a first housing part, a cavity extending into the first housing part, a member substantially filling the cavity, a transponder being embedded in the member, and a second housing part connecting to the first housing part. The first housing part has an exterior surface and includes a first material. The cavity includes a first cavity portion and a second cavity portion. The first cavity portion extends into the first housing part from a first opening in the exterior surface, and the second cavity portion extends in the first housing part between a second opening in the exterior surface and the first cavity portion. The member includes a second material that is different from the first material, and the member has a portion at least partially visibly at the first opening. The transponder is embedded in the member such that at least one of removing the transponder and attempting to remove the transponder visibly damages at least one of the portion of the member, the first opening in the exterior surface, and the exterior surface. The second housing part connects to the first housing part after the member fills the cavity, and the second housing covers the second opening.

The present invention further provides a device for communicating a signal with respect to a system, and the device is relatively portable with respect to the system. The device comprises a housing having an exterior surface, a cavity in the housing, a member that is formed with a size and a shape so as to generally fill the cavity, and a transponder that is located in the member. The exterior surface has a first opening and a second opening, and the cavity extends in the housing between the first and second openings. The member is inserted in the cavity through the first opening after the member is formed, and the member has a portion visible at the second opening after the member is inserted in the cavity. The transponder is located in the member such that removing the transponder damages at least one of the exterior surface and the portion of the member.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF A PREFERRED EMBODIMENT

Figure 1:
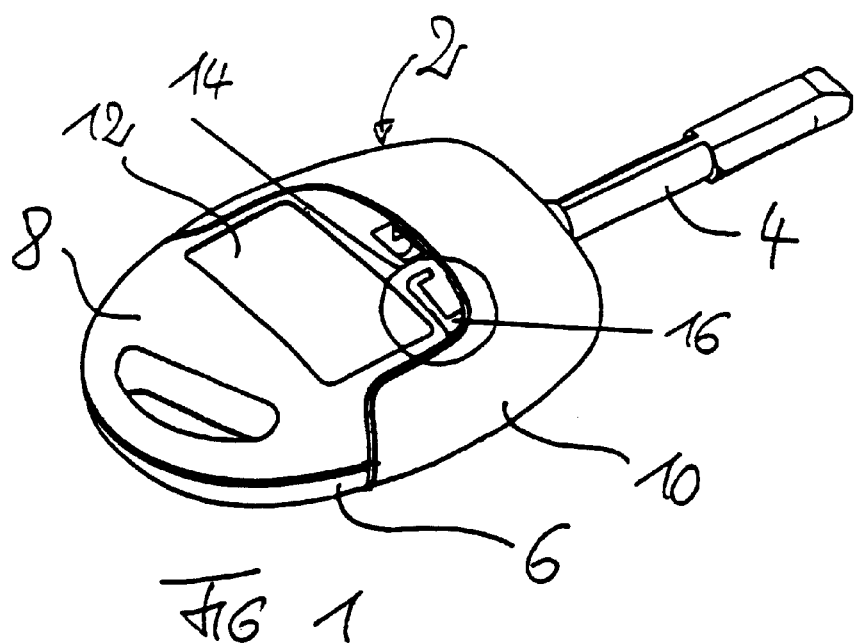
FIG. 1 is a perspective view of an electronic vehicle key according to a preferred embodiment.

Referring to FIG. 1, an electronic vehicle key includes a housing 2 from which a tab or shaft 4 projects.

The housing 2 consists of three housing parts 6, 8 and 10 that can be clipped to each other or connected in some other way.

The top side of housing part 8, which is partially covered by housing part 10, contains an actuating element 12 that can be remotely activated, e.g. by a radio or infrared remote control. A round cell can be provided in housing 2 for energy supply.

Next to actuating element 12, an exterior surface area of housing part 8, which is indicated with a circle and the reference numeral 14, remains free as a visible area. The visible area 14 includes a check opening 16, which can be in the form of a flattened U, remains open for a visual inspection and which is sealed or filled with material having a color that contrast with the remaining surface of housing part 8.

Figure 2:
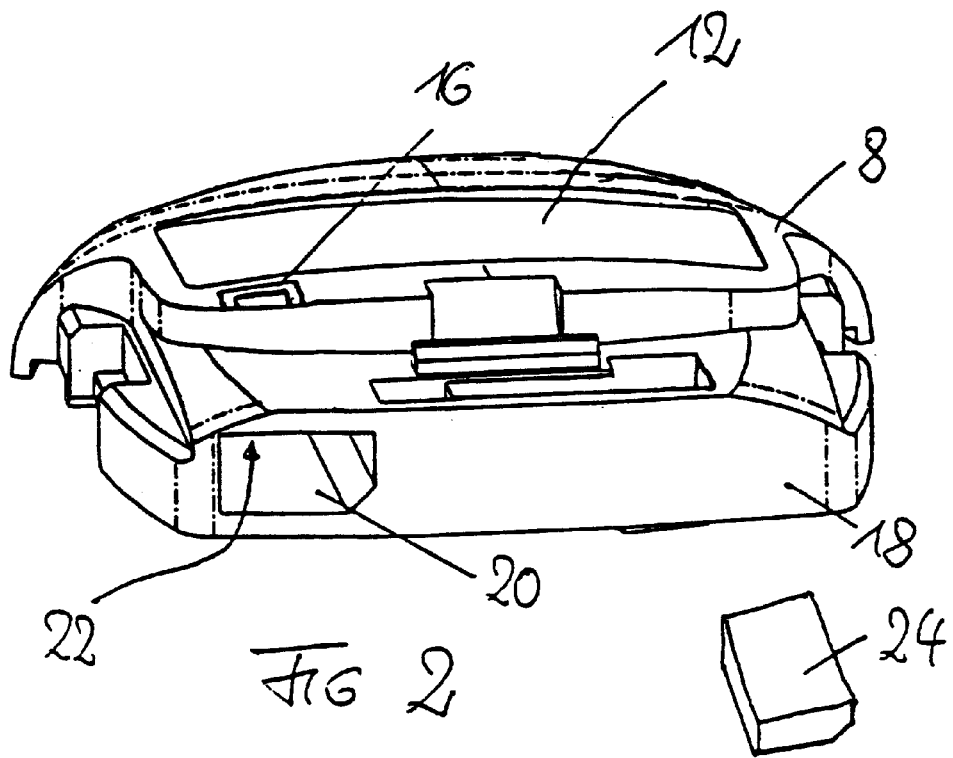
FIG. 2 is a perspective view of a housing part of the key shown in FIG. 1.
Figure 3:
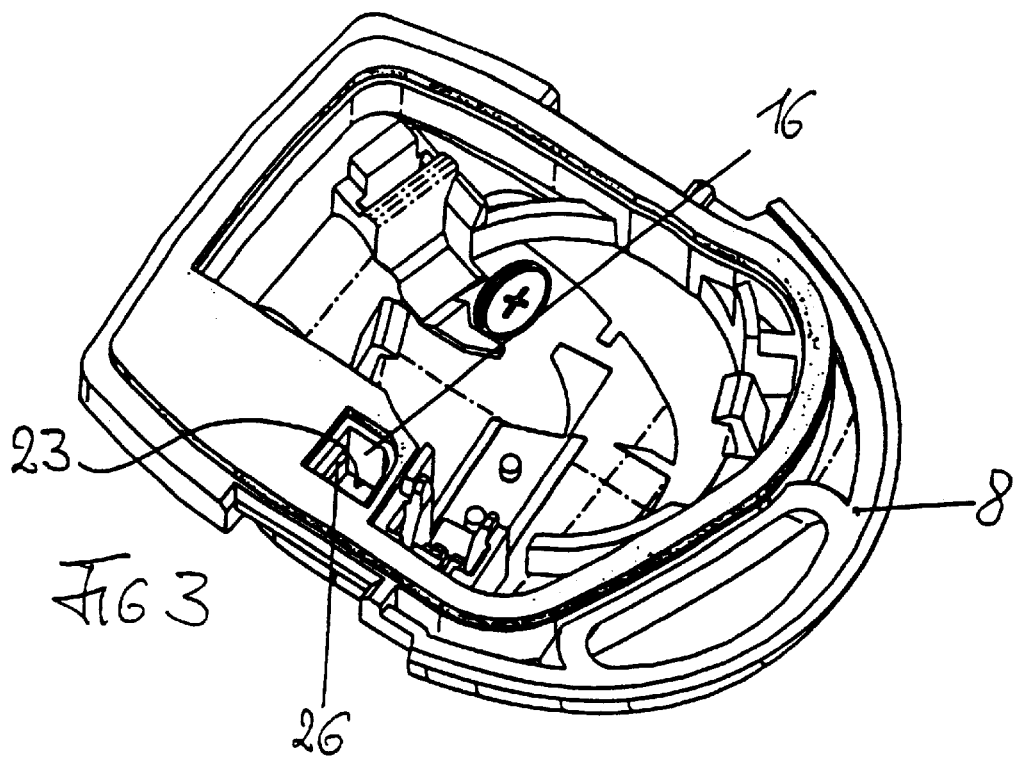
FIGS. 3 and 4 show perspective views, diagonally from below in various manufacturing stages, of the housing part shown in FIG. 2.
Figure 4:
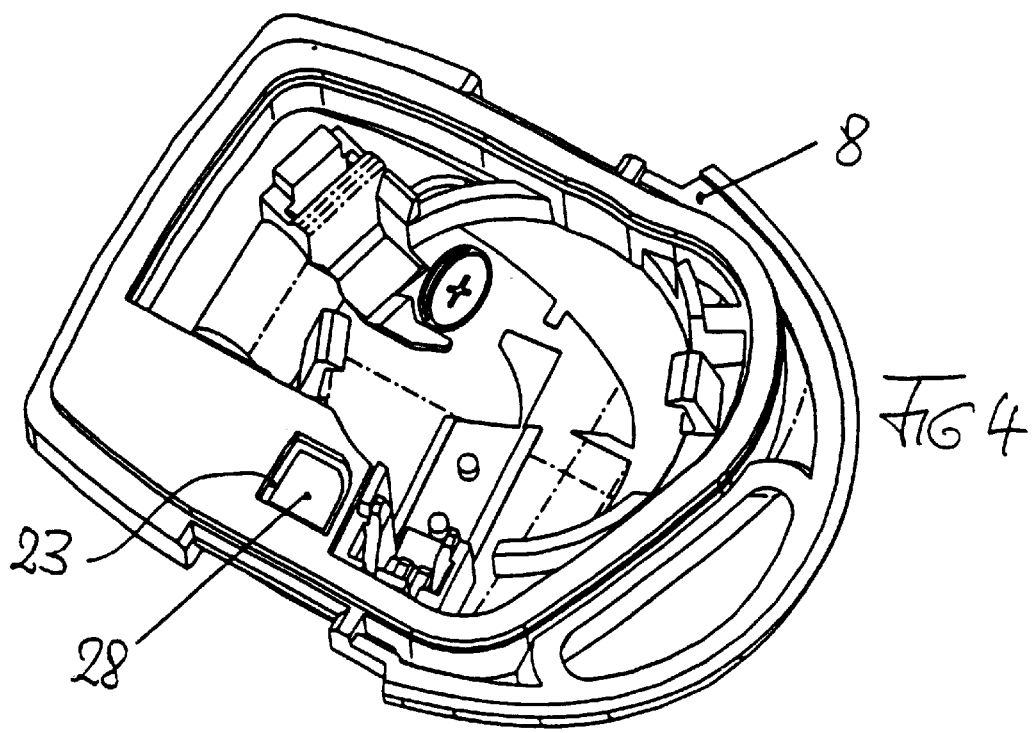

Referring now to FIGS. 2–4, the housing part 8, which is shown as if looking from above the shaft 4, includes an outer surface 18 that forms a separating surface with respect to the housing part 6. Depending on the design of the housing part 10, the housing can include a loading opening 20 leading to a covered channel 22 that connects with a cavity 23 (FIGS. 3 and 4), which connects to the check opening 16. The cavity 23 extends through the entire housing part 8 and has an opening 26 that leads into channel 22. A transponder 24 is shown outside the loading opening 20 in FIG. 2.

Figure 5:
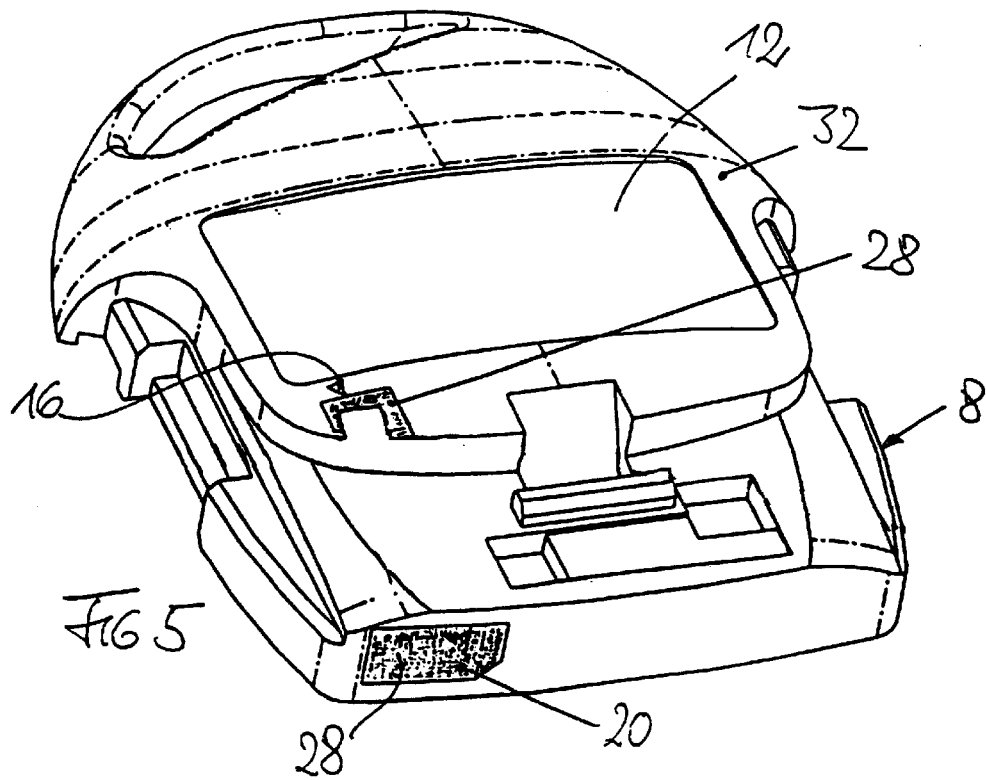
FIG. 5 is a perspective view similar to FIG. 2 showing the housing in the manufacturing step according to FIG. 4.

FIGS. 3 and 4 show the housing part 8 with the housing part 6 removed. FIG. 5 shows a somewhat different perspective view from that of FIG. 2, with the housing part 8 in a final condition of the transponder installation.

Installation of the transponder 24 will now be described with reference to FIGS. 2–5. The transponder 24 is inserted through the loading opening 20 into the channel 22. The transponder 24 can electrically communicate with other components in the housing 2, e.g., with contact shoes, or can communicate such that there are no direct galvanic connections with electrical connections in the housing 2.

A sealing compound 28 is introduced via the check opening 16 so that the transponder 24 is completely sealed in the channel 22. The sealing compound 28 can be poured in from the loading opening 20, or in through the cavity 23, until any excess escapes from the check opening 16. The sealing compound 28 flows through the opening 26 into channel 22 and seals the transponder 24 located there. With the help of passage 26, a secure, form-fit engagement of the sealing compound 28 with housing 8 is achieved so that the transponder 24 can not being taken out of the housing 8 without being destroyed.

FIG. 4 shows the housing part 8 with cavity 23 completely filled with the sealing compound 28. FIG. 1 shows that the cavity 23 is covered at one end by the housing part 6 and, as shown in FIG. 5, the sealing compound 28 in the cavity 23 remains visible via the check opening 16 at the other end, even after completely assembled housing.

The sealing compound 28 can generally fill the cavity 23 and the check opening 16 such that a level surface is produced in the visible area 14, i.e. the sealing compound 28 makes a smooth transition with respect to the surface of the housing part 8. FIG. 5 shows that the sealing compound 28 can also be visible at the loading opening 20, which can be sealed by the sealing compound 28.

The housing part 8 shown in FIG. 5 can be joined with the other housing parts 6 and 10 to provide the finished housing for the electronic key shown in FIG. 1. According to the illustrated preferred embodiment, the sealing compound 28 filing up the check opening 16 remains visible from the outside in the visible area 14. The housing part 6 can be transparent in at least the area of the cavity 23 such that another visible area is created.

The dimensions of the check opening 16 and the channel 22 in which transponder 24 is held, and the material for the sealing compound 28 are selected in such a way that an attempt to remove the transponder 24 will lead to changes in the appearance of the sealing compound 28 at the area of the check opening 16 or of the housing itself. For example, the sealing compound 28 can include a relatively brittle material that will break if forceful manipulations occur in the area of the channel 22. Additionally, the sealing compound 28 can also include a material with a different color than that of the surface of housing part 8. Using a material for the sealing compound 28 that is different from the material of housing part 8 has the advantage that the actual presence of the sealing compound can be checked in a simple manner, e.g., visibly. Further, the arrangement of at least one of the cavity 23 and the check opening 16 can be configured with different contours or different cross-sections such that the sealing compound 28 interlocks with the housing part 8, thereby securely anchoring the sealing compound 28 with respect to the housing part 8. The sealing compound 28 in cavity 23 can also be anchored with respect to the channel 22 in the vicinity of the leaving opening 26. Anchoring is not absolutely necessary if, for example, the sealing compound 28 is injected or otherwise applied (for example, a melting powder), and bonds with the material of the housing part 8. The distance from the check opening 16 to the channel 22 or to the topside of the transponder can be relatively small so that the sealing compound 28 will definitely be damaged by forceful manipulations.

The wall of the housing part 8, especially in the visible area 14 above the transponder 24, can be suitably designed, e.g., made sufficiently thin, so as to be damaged in a visible way during tampering with the transponder 24 in the channel 22. Further, the transponder 24 can be glued to a wall of the channel 22. Sealing of the check opening 16 with a material that is different from the material of the housing part 8 can be additionally advantageous if the sealing compound 28 that is to be used is not readily accessible. Thus, it would be difficult for a person to repair the housing part 8 after attempting to tamper with or remove a transponder 24.

Figure 6:
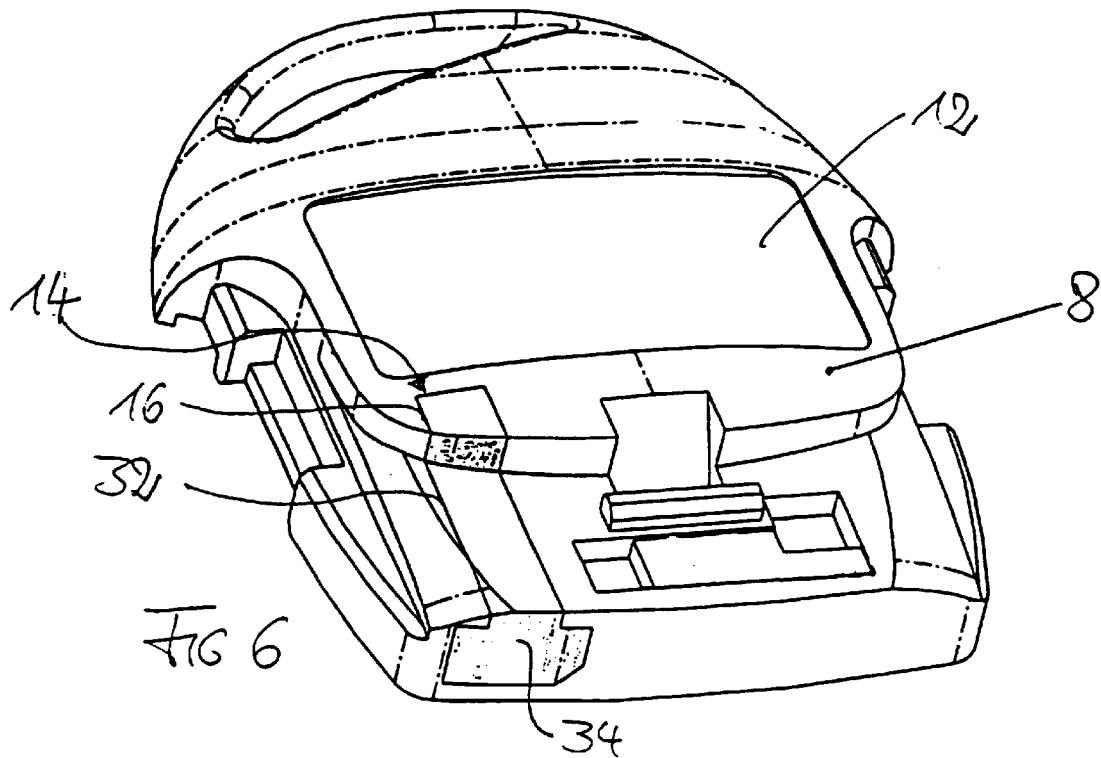
FIG. 6 is a perspective view of an electronic vehicle key according to another preferred embodiment.

Referring now to FIG. 6, a modified channel 32 can be open toward the top of the housing part 8. A part 34 having a transponder 24 molded therein and having a cross section corresponding to the channel 32 can be slid into the housing part 8. According to a preferred embodiment, the part 34 is formed in a mold, e.g. by injection molding, with the transponder 24 placed in the mold prior to the molding. The molded part 34 is then slid into channel 32 and can be glued in place. The molded part 34 with the transponder 24 arranged within it is available for inspection in the visible area 14, i.e. in the area of the channel 32 that forms check opening 16. The arrangement according to FIG. 6 can also be achieved by positioning the transponder 24 in the open channel 32 and then filling the entire channel 32 with the a sealing material.

All different types of plastic can be used for the material of the molded part 34 and for the material of the sealing compound 28. Generally, it is advantageous if the material can be injected or poured.

All of these embodiments can be used in connection with any type of device that is fitted with a transponder. A preferred embodiment is used with electronic vehicle keys. Additionally, these embodiments can be used for electronic vehicle cards or fobs, i.e., a unit without the tab or shaft 4, which can be used in connection with a "keyless-go" operation.

Thus, a device that includes a transponder 24 can be designed in such a way that if the transponder 24 is removed, or if there is an attempt to remove the transponder 24, there will be visible damage to the housing part 8. Of course, the damage may also be detectable by other means, e.g., by tactile detection. Because of this, it is not possible to tamper with the transponder 24 in the device without attracting the attention of the authorized user.

While this application discloses certain preferred embodiments, numerous modifications, alterations, and changes to the described embodiments are possible without departing from the spirit and scope of the disclosure, as defined in the appended claims. Accordingly, it is intended that this application not be limited to the described embodiments, but that it have the full scope defined by the language of the following claims, and equivalents thereof.

What is claimed is:

1. A device for communicating a signal with respect to a system, the device comprising:
   a housing including:
      a first housing part including:
         a cavity adjacent an exterior surface;
         a first opening in fluid communication with the cavity; and
         a second opening in fluid communication with the cavity; and
      a second housing part covering the first opening;
   a transponder being located in the cavity such that movement of the transponder in the cavity damages the exterior surface;
   wherein the transponder passes through the first opening into the cavity in the first housing part, the second housing part covers the first opening after the transponder passes into the cavity in the first housing part, the second opening, is visible on the exterior surface when the second housing part covers the first opening, and the second opening is visibly damaged by removing the transponder from the cavity.

2. The device according to claim 1, wherein the movement of the transponder comprises an attempt to remove the transponder from the cavity.

3. The device according to claim 1, wherein the transponder is fixed in the cavity.

4. The device according to claim 1, wherein the movement of the transponder damages the exterior surface in a manner that is visible.

5. The device according to claim 1, further comprising:
   a compound sealing the transponder in the cavity.

6. The device according to claim 5, wherein the housing comprises a first material and the compound comprises a second material that is different from the first material.

7. The device according to claim 6, wherein the second material is relatively brittle with respect to the first material.

8. The device according to claim 5, wherein the exterior surface comprises a check opening in fluid communication with the cavity, and the movement of the transponder damages the check opening.

9. The device according to claim 1, further comprising:
   a compound sealing the transponder in the cavity.

10. The device according to claim 9, wherein the compound anchors the transponder with respect to the cavity.

11. The device according to claim 1, wherein the cavity comprises a first cavity portion and a second cavity portion, the first cavity portion extends between a first area of the exterior surface and a second area of the exterior surface, and the second cavity portion extends between a third area of the exterior surface and the first cavity portion.

12. The device according to claim 11, wherein the transponder is located in the second cavity portion and the first cavity portion comprises a check opening at which damage due to the removing the transponder is visible.

13. The device according to claim 12, further comprising:
   a compound sealing the transponder in the cavity, the compound being visible at the check opening.

14. A device for communicating a signal with respect to an authorization system for actuating a motor vehicle, the device being relatively portable with respect to the motor vehicle, the device comprising:
   a first housing part having an exterior surface and including a first material;
   a cavity including a first cavity portion and a second cavity portion, the first cavity portion extending into the first housing part from a first opening in the exterior surface, and the second cavity portion extending in the first housing part between a second opening in the exterior surface and the first cavity portion;
   a member substantially filling the cavity and including a second material that is different from the first material, the member having a portion at least partially visibly at the first opening;
   a transponder being embedded in the member such that at least one of removing the transponder and attempting to remove the transponder visibly damages at least one of the portion of the member, the first opening in the exterior surface, and the exterior surface; and
   a second housing part connecting to the first housing part after the member fills the cavity, the second housing covering the second opening.

15. A device for communicating a signal with respect to a system, the device being relatively portable with respect to the system, the device comprising:
   a housing having an exterior surface, the exterior surface having a first opening and a second opening;
   cavity extending in the housing between the first and second openings;
   a member being formed with a size and a shape so as to generally fill the cavity, the member being inserted in the cavity through the first opening after the member is formed, and the member having a portion visible at the second opening after the member is inserted in the cavity;
   a transponder being located in the member such that removing the transponder damages at least one of the exterior surface and the portion of the member.

16. The device according to claim 15, wherein the housing comprises a first housing part and a second housing part, the first housing part generally defining the first opening, the second opening and the cavity, and the second housing part covering the first opening after the member is inserted in the cavity.

17. The device according to claim 15, wherein the member comprises a molded compound.

* * * * *